United States Patent [19]

Berenschot et al.

[11] 4,081,416

[45] Mar. 28, 1978

[54] HIGH GLOSS LATEX COATINGS CONTAINING MERCAPTAN-TERMINATED EMULSION COPOLYMER AND DISSOLVED CARBOXYL-FUNCTIONAL RESIN SALT

[75] Inventors: Donald J. Berenschot, Chicago; Dale F. Anders, Fox River Grove; Fred D. Hawker, Villa Park, all of Ill.

[73] Assignee: DeSoto, Inc., Des Plaines, Ill.

[21] Appl. No.: 740,234

[22] Filed: Nov. 9, 1976

[51] Int. Cl.$^2$ .............................................. C08L 61/28
[52] U.S. Cl. ...................... 260/29.4 UA; 260/22 CB; 260/850; 260/851; 260/856; 428/460; 428/524
[58] Field of Search ....... 260/29.4 UA, 39 M, 22 CB, 260/856, 851

[56] References Cited

U.S. PATENT DOCUMENTS 3,919,154  11/1975  Chang et al. ................ 260/29.4 UA

*Primary Examiner*—Theodore E. Pertilla
*Attorney, Agent, or Firm*—Dressler, Goldsmith, Clement, Gordon & Shore, Ltd.

[57] ABSTRACT

Pigmented thermosetting aqueous latex coating compositions adapted to deposit coatings which cure on baking to provide superior gloss are provided using an aqueous latex of hydroxyl-functional and mercaptan-terminated aqueous emulsion copolymer particles, the aqueous continuum of the latex having dissolved therein a carboxyl-functional resin salt. An aminoplast resin is dispersed in the aqueous latex to enable the thermosetting cure to take place.

15 Claims, No Drawings

HIGH GLOSS LATEX COATINGS CONTAINING MERCAPTAN-TERMINATED EMULSION COPOLYMER AND DISSOLVED CARBOXYL-FUNCTIONAL RESIN SALT

The present invention relates to pigmented thermosetting aqueous coatings containing a latex of emulsion copolymerized copolymer particles which deposit hard and tough solvent-resistant coatings characterized by improved gloss.

The provision of thermosetting aqueous latex coatings of the type described represents a problem which has long puzzled the art, and it is an important problem because it is only when aqueous emulsion copolymer particles are used in an aqueous latex that the organic solvent content of the aqueous coating can be minimized while maximizing the resin solids content thereof. High gloss has been particularly difficult to obtain when the bulk of the resin solids which are deposited is constituted by copolymer particles produced by aqueous emulsion copolymerization to provide a pigmented latex system.

In this invention it has been found that when the aqueous emulsion copolymer is hydroxyl-functional and mercaptan-terminated, and when a minor proportion of carboxyl-functional resin salt is dissolved in the aqueous continuum, that aminoplast resin-containing pigmented thermosetting aqueous latex coating compositions can be formulated which will cure on baking to provide hard and impact-resistant coatings which exhibit superior gloss.

The first essential component of the thermosetting aqueous latex coatings is the hydroxyl-functional aqueous emulsion copolymer which provides the latex on which the system is based. This emulsion copolymer will consitute at least about 60% of the total resin solids which are subjected to cure by the aminoplast component. The copolymer consists essentially of at least about 70% by weight of nonreactive monoethylenically unsaturated monomers which are copolymerized with from about 5% up to about 30% if ethylenically unsaturated material containing reactive groups which are primarily constituted by non-nitrogenous alcoholic hydroxy groups. These proportions are based on the total weight of ethylenically unsaturated material subjected to copolymerization. While the reactive groups are primarily hydroxy groups, some carboxyl functionality is desirably present to enhance emulsion stability, though significant solubilization of the emulsion copolymer in the aqueous medium would destroy the latex system which is desired, and this would make it impossible to provide the high resin solids and low organic solvent contents which are the essence of this invention. Thus, and while the emulsion polymer may include carboxyl functionality and while there will be a volatile base present, the emulsion polymer will be largely insoluble in the aqueous composition which is provided.

The nonreactive monomers providing the bulk of the copolymer are illustrated by styrene, vinyl toluene and methyl methacrylate, these usually being used in combination with esters of lower alkanols with monoethylenic carboxylic acids such as acrylic acid or methacrylic acid. These esters are illustrated by ethyl acrylate and isobutyl acrylate, but $C_2$-$C_{10}$ alcohols are generally useful and diverse unsaturated acids such as crotonic acid and fumaric acid can be used for ester formation. Vinyl acetate and acrylonitrile will further illustrate the useful nonreactive monomers. Of the esters, isobutyl acrylate is particularly preferred because of its favorable copolymerization rate with styrene or vinyl toluene.

The selection of monomers in this invention will desirably provide a copolymer having a glass transition temperature of at least about 0° C.

The reactive monomers will include at least about 4% of non-nitrogenous hydroxy-functional ethylenically unsaturated material. The alcoholic hydroxy group is denoted by this language. Monoethylenic monomers in an amount of at least 2% of the weight of the copolymer are preferably used together with an unsaturated hydroxy-functional polyester, since this gives the most outstanding results. The monoethylenically unsaturated monomers are illustrated by hydroxy ethyl acrylate or methacrylate, hydroxy propyl acrylate or methacrylate, or allyl alcohol. Hydroxy ethyl acrylate or hydroxy ethyl methacrylate are preferred.

In preferred practice, 2–20% of hydroxy monomer (preferably 4–15%) is combined with 2–12% (preferably 4–10%) of the hydroxy-functional polyester.

The unsaturated hydroxy-functional polyesters which are preferably used herein are, as is conventional, a product of polyesterification in one or more stages, of polybasic acids with polyhydric alcohols, the polyhydric alcohol being used in considerable stoichiometric excess to produce the hydroxy functionality which is desired.

The unsaturation required to permit interpolymerization or copolymerization can be introduced into the polyester in various ways as more fully described in U.S. Pat. No. 3,163,615 granted Dec. 29, 1964.

In brief summary, the unsaturated polyester resin should contain about 0.005 to 0.40 gram mol of ethylenically unsaturated component per 100 grams of polyester, and the hydroxyfunctional polyester resin should have an hydroxy functionality indicated by an hydroxy number of from 100–350, preferably from 150–300 (milligrams of KOH to saponify 1 gram of resin).

The preferred hydroxy-functional polyethylenically unsaturated polyesters in accordance with this invention are glycerine-based polyesters made from components containing an at least 25% stoichiometric excess of hydroxy functionality, the bulk of the unsaturation in said polyester being contained in the residues of ethylenically unsaturated monocarboxylic acids. The most preferred glycerine-based polyesters are short oil polyesters which have an hydroxy value of at least 100, a Gardner viscosity in n-butanol at 80% solids in the range of from T to $Z_2$, and which contain from 0.03–.3 gram mol of unsaturated comonent per 100 grams of polyester.

A particularly preferred hydroxy-functional polyester for use in the invention is prepared as follows, and is referred to hereinafter as "Hydroxy-Functional Polyester Resin A."

Charge into a reactor equipped with an agitator, heating mantle, Dean-Start trap, thermometer and nitrogen inlet tube, 790 grams of dehydrated castor oil fatty acids, 250 grams of crotonic acid, 785 grams of glycerine and 400 grams of isophthalic acid. Add 50 grams of xylol as reflux solvent. Heat to 420° F. and hold for acid value of 5.0. Cool to 380° F. and add 240 grams of a technical grade of 1,1'-isopropylidenebis(p-phenylenoxy)-di-2-propanol, 160 grams of phthalic anhydride and 255 grams of azelaic acid. Heat to 420° F. and hold for an acid value of 13–15. Add 510 grams of butyl alcohol to provide a solution containing 80% solids.

The final characteristics of the polyester resin are:
Solids (percent): 79.5
Viscosity (Gardner): V-W
Color (Gardner): 3-4

It is preferred, but not essential, to have the copolymer include a small proportion, up to about 15%, but more preferably from 0.3-10%, most preferably from 0.5-2%, based on the weight of the copolmer of monoethylenically unsaturated acid, especially a carboxylic acid, such as acrylic acid, methacrylic acid, itaconic acid, crotonic acid, fumaric acid, monobutyl maleate, and the like. The presence of a small amount of acid helps to stabilize the aqueous dispersions in the presence of ammonia or an amine and it also helps the ultimate cure with aminoplast resin.

Up to about 5% by weight of the copolymer may be constituted by diverse materials to improve adhesion or other special property, and the inclusion of such small amount of special monomers for special purpose is contemplated by the language "consisting essentially".

The aqueous emulsion copolymer is produced by copolymerizing a liquid mixture of polymerizable monomers dispersed in aqueous medium in the form of finely divided particles of sufficient fineness (up to about 3 microns) to be stably dispersed in water. As is known, aqueous emulsion copolymers are usually of high molecular weight, but the copolymerization herein is carried out with from 0.2 to about 5% of mercaptan, preferably from 0.5 – 2% of mercaptan, based on the weight of the copolymer present in the monomer mixture. This provides mercaptan-terminated copolymer particles. Mercaptans are well known for lowering the molecular weight of acrylic copolymers, and any of those known for this purpose are useful herein. These are generally $C_3$ – $C_{22}$, preferably $C_4$ – $C_{18}$ alkyl mercaptans which have the formula: RSH.

The copolymerization is carried out using a monomer mixture which is dispersed in the aqueous continuum and conventional free radical catalysis and suspending agents are employed to produce a stable emulsion of slid copolymer particles in the aqueous continuum.

The emulsion copolymers are preferably copolymerized using a procedure which will produce fine particle size emulsions. Preferred particle size is from 0.05 to 1 micron, though from 0.01 to 3 microns is broadly contemplated. These fine particle size latex emulsions are prepared by incrementally adding the unsaturated copolymerizable material, water surface active agents to a water solution which has dispersed therein surface active agents. The addition is made under conditions conducive to addition copolymerization so that copolymerization takes place as the materials are added.

Ammonia or an amine are added to the aqueous emulsion to help to stabilize the same, but this does not solubilize the copolymer particles. Hydroxy functional amines are particularly useful and this class of materials is illustrated herein by dimethyl ethanolamine. Other amines which may be used are triethyl amine, diisopropanol amine, and methyl diethanol amine. Even partial neutralization is helpful, but it is preferred to use enough amine to provide a pH of 6.0 or higher up to about 11, preferably from 7 to 10.

The carboxyl-functional resin which is dissolved in the aqueous continuum of the latex in the form of a salt with a volatile base may be of diverse type so long as it is compatible with the emulsion copolymer in the final baked film. In preferred practice, the dissolved resin salt provides from 5% to 35% of the resin solids to be cured. It has been found that the dissolved resin improves the wetting of pigments and, together with the mercaptan termination of the emulsion copolymer particles, provides improved gloss. A minor proportion of water miscible organic solvent, such as 2-ethoxy ethanol and the like may be used in an amount of from 10% to about 125% of the weight of the carboxyl-functional resin in order to improve solubility with water.

As will be apparent, the term "solution" here embraces a colloidal solution and any volatile base may be used, such as ammonia or the amines noted hereinbefore for stabilizing the aqueous emulsion copolymer.

It is stressed that these amines solubilize the carboxyl-functional resins which are here referred to, while the aqueous emulsion copolymer particles remain insoluble in the aqueous medium. The carboxyl-functional resin is preferably one of two types. In one preferred form of water soluble carboxyl-functional resin, the resin is formed by producing a relatively low molecular weight carboxyl-functional polyester. Almost any polyester having a molecular weight up to about 30,000, more preferably below about 10,000, and which is organic solvent-soluble can be used in this invention so long as it possesses an acid value in the range of from about 30-300, preferably about 40-140. Carboxyl-functional polyester resins of the type referred to are well known, and one of these will be used in the accompanying examples.

It is also possible to employ acrylic copolymers which include sufficient copolymerized monoethylenic unsaturated carboxylic acid, such as acrylic acid, methacrylic acid, crotonic acid, itaconic acid, or fumaric acid, to provide an acid value in the same range referred to for the polyester resins. The balance of the copolymer may be constituted by any of the monoethylenic monomers described hereinbefore with reference to the aqueous emulsion copolymer.

The difference between the emulsion copolymer and the solution copolymer is the copolymerization in organic solvent solution, the solvent being preferably water miscible. The solution copolymerization produces a polymer which is of much lower molecular weight than can be provided by the aqueous emulsion copolymerization (despite the presence of the mercaptan) and the result is that extensive solubilization is achieved. Also, and in the emulsion polymer, one generally employs a much smaller proportion of carboxylic acid so that the combination of higher molecular weight, lower acidity, and physical form, create a polymer particle which is essentially insoluble in the aqueous medium despite the presence of the volatile base which forms a salt with the available carboxyl functionality. Of course, much of this carboxyl functionality is not available in the emulsion copolymer particle because it is bound within the particle and also because the emulsion copolymer particle is protected in part by the surfactants which surround it.

As previously indicated, the mixture of emulsion copolymer and dissolved resin salt is cured with an aminoplast resin. The term "aminoplast resin" is a conventional one, designating heat-hardening reaction products of an aldehyde, normally formaldehyde with a polyfunctional amine, such as urea, melamine, benzoguanamine, or other triazine. A stoichiometric excess of formaldehyde is frequently used to provide the heat-hardening properties. The resins are frequently etherified, usually with methanol, to promote water solubility. Any water soluble or water dispersible aminoplast resin is useful herein.

The proportion of aminoplast resin, based on total resin solids, may vary from about 3% to about 40%, but is preferably from 5-30%. Most usually, the aminoplast resin is used in an amount of from 8-25%.

A water miscible or immiscible organic solvent, such as butyl Cellosolve acetate (immiscible) or butyl Cellosolve, or ethylene glycol (miscible), is desirably incorporated into the aqueous latex to assist the copolymer particles to coalesce when a film thereof is deposited on a substrate. A small proportion, e.g., from 2-10% of an ester plasticizer such as dioctyl adipate or the like, is also desirably incorporated into the latex to assist coalescing and flow properties. In the preferred practice of this invention, the total proportion of organic solvent present in the latex coating composition will not exceed 20% of the total weight of resin. Such a small proportion of solvent would not be sufficient were is not for the large proportion of emulsion copolymer particles.

It is also possible to include a small amount of high boiling water miscible or immiscible organic solvent in the emulsion to help the copolymer particles coalesce. Particle coalescence may occur prior to baking as the water evapores during a 5-10 minute flash period, and the presence of a glycol, such as ethylene glycol or diethylene glycol aids coalescence and flow during the bake.

The compositions of the invention are cured by baking, typical baking conditions ranging from 300° F. to 550° F. for a period of time of from 30 minutes to 30 seconds.

The latex coating compositions of this invention are pigmented systems and the water soluble resin importantly functions to provide superior pigment wetting. The pigment may be incorporated in any desired manner as is conventional in the production of pigmented aqueous latices. However, it is preferred in this invention to grind the pigment into the water soluble or water dispersible aminoplast resin or into the water soluble resin solution, and these car then be mixed into the copolymer latex. Aluminum pigment is a typical pigment, but titanium dioxide or corrosion resistant chromate pigments are also useful. Aluminum flake pigment is especially difficult to wet in the absence of the invention, and its use is a feature of the invention.

The invention is illustrated in the examples which follow, in which all parts are by weight, unless otherwise indicated.

EXAMPLE 1

| RAW MATERIALS | | PARTS |
|---|---|---|
| A. | Distilled Water | 55.56 |
| B. | Sodium Bicarbonate | 0.10 |
| C. | Potassium Persulfate | 0.37 |
| D. | Sodium Dodecyl Benzene Sulfonate (98% active) | 0.09 |
| E. | Distilled Water | 54.56 |
| F. | Sodium Lauryl Sulfate (30% active) | 2.67 |
| G. | Nonyl Phenoxy(polyethyleneoxy)ethanol (9 1/2 mols of ethylene oxide per mol of phenol) | 2.42 |
| H. | Styrene | 28.28 |
| I. | Isobutyl Acrylate | 33.61 |
| J. | Isobutyl Methacrylate | 20.11 |
| K. | Hydroxyethyl Methacrylate (94% active) | 8.50 |
| L. | Methacrylic Acid | 2.00 |
| M. | Hydroxy-Functional Polyester Resin A (80% solids) | 10.00 |
| N. | Dimethylethanolamine | 1.00 |

| RAW MATERIALS | | PARTS |
|---|---|---|
| O. | t-Dodecyl Mercaptan | 0.50 |

PROCEDURE

1. Charge item A to reactor, sparge with nitrogen for 20 minutes while heating to 75° C.
2. Blend items E through G is a glass beaker. Check to determine that item G is completely solvated prior to starting step 3.
3. Charge items H through M and O to a glass beaker described in step 2 under good agitation. Items H through M and O may be blended prior to charging. Decrease agitation when a good pre-emulsion is obtained.
4. To the reactor, when at 75° C, charge items B, C, and D. Addition of pre-emulsion should be started within 3 to 4 minutes.
5. Start addition of pre-emulsion as described in step 3 to reactor at such a rate as to allow for a total addition time of 2½ hours. Maintain reactor temperature between 78°-80° C.
6. Hold the reactor for 2 hours after addition is complete or until solids of 46.8 is obtained. Maintain temperature between 84°-86° C.
7. Cool reactor to 37° C.
8. Charge slowly item N to reactor under good agitation.
9. Filter emulsion.

| EMULSION CHARACTERISTICS | |
|---|---|
| Solids | Actual 46.8–47.0 Theoretical 47.66 |
| pH | About 7.9 |
| Viscosity, cps | 300–475 (Brookfield Viscometer, Spin. #2, 20 r.p.m. |
| Wt./Gal. | 8.60 |
| Freeze-Thaw | Pass Four cycles |
| Heat Stability | Pass 10 days at 54° C. |

The polymer particles contained in the resulting latex have a glass transition temperature of about 13° C.

EXAMPLE 2

| Grams | |
|---|---|
| 1530 | 2,2-dimethyl-3-hydroxypropyl-2,2-dimethyl-3-hydroxypropionate |
| 650 | trimellitic anhydride |
| 175 | isophthalic acid (95%) |
| 2 | dibutyl tin oxide |
| 50 | xylol |

The above are charged to a flask equipped with a reflux condenser and trap. The trap is set with xylol and the contents of the flask are heated to reflux (210° C.) and 100 cc water is collected. The reaction mixture is then cooled to 190° C. and held for an acid value of 50-51. The product is then cooled and 420 grams of 2-ethoxy ethanol and 180 grams of methyl ethyl ketone are added whereupon the mixture is further cooled to 70° C. and 140 parts of dimethyl ethanol amine are added over 10 minutes, and 400 parts of distilled water are added over 20 minutes. The acidic polyester aqueous solution product has a Gardner-Holdt viscosity of X-Y and a solids content of 64.9%.

EXAMPLE 3

The pigmented latex coating is made by dispersing 330 parts of titanium dioxide rutile in a mixture of 4 parts dimethyl ethanol amine, 66 parts of hexamethoxy methyl melamine and 75 parts of water to form a paste which is thinned with 75 parts of water. The resulting slurry is added with agitation to a mixture of 396 parts of the Example 1 emulsion and 100 parts of the Example 2 polyester. The latex coating composition so-provided was sprayed on acrylic-primed steel panels and baked 20 minutes at 350° F. The cured coating has a pencil hardness of 3H, it passed 30 inch pounds of forward impact, and it has a gloss of 87 (60° glossmeter).

We claim:

1. Pigmented thermosetting aqueous latex coating composition adapted to deposit adherent coatings which cure on baking to provide superior gloss, comprising an aqueous latex of aqueous emulsion copolymer particles, said copolymer particles being hydroxyl-functional and mercaptan-terminated and said aqueous latex containing a carboxyl-functional resin salt dissolved in the aqueous continuum of the latex, said emulsion copolymer particles constituting at least about 60% of the weight of the resin solids to be cured and said dissolved resin salt providing the balance of the resin solids to be cured, said emulsion copolymer particles consisting essentially of at least about 70% by weight of nonreactive monoethylenically unsaturated material containing reactive groups of which at least about 4% by weight provides the non-nitrogenous hydroxy group, and an aminoplast resin dispersed in said latex to enable the thermosetting cure to take place.

2. A latex coating composition as recited in claim 1 in which said aminoplast resin is present in an amount of from about 3% to about 40%, based on the total weight of resin solids.

3. A latex coating composition as recited in claim 1 in which said dissolved resin salt provides from 5% to 35% of the resin solids to be cured.

4. A latex coating composition as recited in claim 1 in which emulsion copolymer particles are terminated with from 0.2% to about 5%, based on the weight of the copolymer, of $C_4$–$C_{18}$ alkyl mercaptan.

5. A latex coating composition as recited in claim 1 in which said non-nitrogenous hydroxy functionality is supplied by a combination of from 2–20% of monoethylenically unsaturated hydroxy monomer and from 2–12% of polyethylenically unsaturated polyester having an hydroxy number of from 100 to 350.

6. A latex coating composition as recited in claim 5 in which said hydroxy-functional polyester contains about 0.005 to 0.40 gram mol of ethylenically unsaturated component per 100 grams of polyester and said polyester has a Gardner voscosity in n-butanol at 80% solids in the range of C to $Z_6$.

7. A latex coating composition as recited in claim 6 in which said hydroxy-functional polyester is a short oil glycerine-based polyester made from components containing an at least 25% stoichiometric excess of hydroxy functionality, has a Gardner viscosity in n-butanol at 80% solids in the range of from T to $Z_2$, and contains from 0.03–0.3 gram mol of unsaturated monocarboxylic acid component per 100 grams of polyester.

8. A latex coating composition as recited in claim 5 in which said hydroxy monomer is used in an amount of from 4–15% and said hydroxy polyester is used in an amount of from 4–10%.

9. A latex coating composition as recited in claim 1 in which said emulsion copolymer contains copolymerized hydroxy ethyl acrylate or methacrylate and from 0.3–10% of monoethylenically unsaturated carboxylic acid.

10. A latex coating composition as recited in claim 1 in which said carboxyl-functional resin has an acid value of from 30–300 and is at least partially neutralized with a volatile base.

11. A latex coating composition as recited in claim 10 in which said carboxyl-functional resin has an acid value of from 40–140 and is a polyester resin having a molecular weight below about 30,000.

12. A latex coating composition as recited in claim 10 in which said carboxyl-functional resin has an acid value of from 40–140 and is a copolymer of monoethylenically unsaturated monomers comprising sufficient monoethylenic carboxylic acid to provide the said acid value.

13. Pigmented thermosetting aqueous latex coating composition adapted to deposit adherent coatings which cure on baking to provide superior gloss, comprising an aqueous latex of aqueous emulsion copolymer particles, said copolymer particles being hydroxy-functional and terminated with from 0.5–2% of $C_4$–$C_{18}$ alkyl mercaptan, and said aqueous latex containing a carboxyl-functional resin salt dissolved in the aqueous continuum of the latex, said emulsion copolymer particles constituting at least about 60% of the weight of the resin to be cured and said resin having an acid value of from 30–300 at least partially neutralized with a volatile base to provide a salt in an amount of from 5–35% of the resin solids to be cured, said emulsion copolymer particles consisting essentially of at least about 70% by weight of nonreactive monoethylenically unsaturated monomers providing a copolymer having a glass transition temperature of at least about 0° C, and from about 5% up to about 30% of ethylenically unsaturated material containing reactive groups of which at least about 4% by weight provides the non-nitrogenous hydroxy group, and from about 3% to about 40%, based on the total weight of resin solids, of an aminoplast resin dispersed in said latex to enable the thermosetting cure to take place.

14. A latex coating composition as recited in claim 13 in which said carboxylic acid resin is solubilized with an amine and water-miscible organic solvent.

15. A latex coating composition as recited in claim 13 in which said latex contains less than about 20%, based on the total weight of resin, of volatile organic solvent.

* * * * *